April 8, 1952     J. W. HILL     2,591,814
HOLE LOCATING DEVICE
Filed June 19, 1947
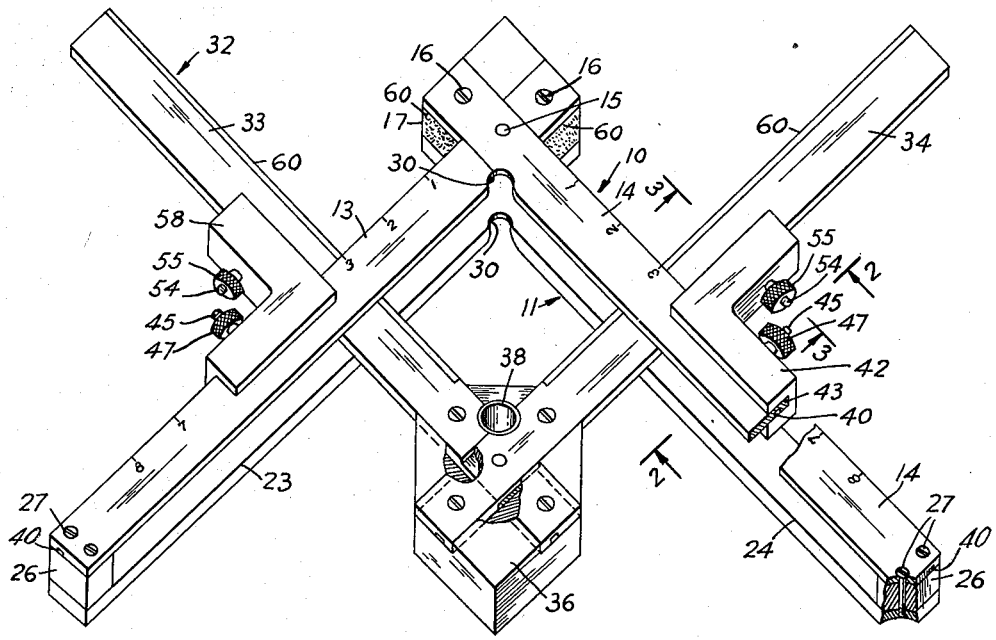
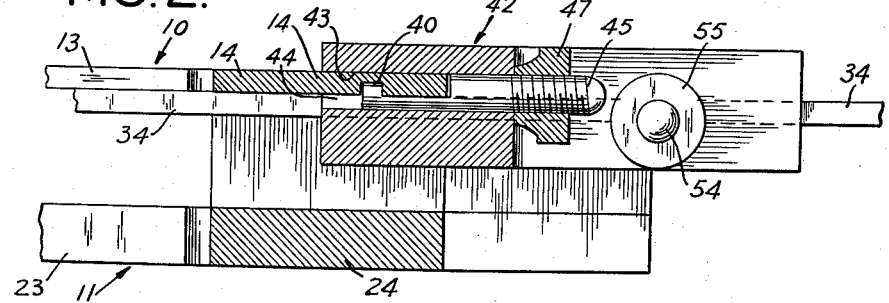
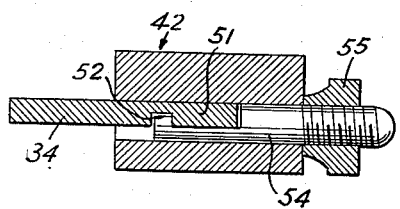
INVENTOR.
John W. Hill.
BY Emery, Varney, Whittemore & Dix
ATTORNEYS.

Patented Apr. 8, 1952

2,591,814

UNITED STATES PATENT OFFICE 2,591,814

HOLE LOCATING DEVICE

John W. Hill, Palisades, N. Y.

Application June 19, 1947, Serial No. 755,552

5 Claims. (Cl. 33—189)

This invention relates to gauges for locating a number of spaced points in a predetermined spaced relation to one another and with precision. The invention relates more especially to apparatus that can be used for positioning a drill on a workpiece in which holes are to be made.

One object of the invention is to provide an improved hole locating gauge that can be applied directly to a workpiece and held in position on the workpiece by clamps or other holding means.

Another object is to provide a simplified precision hole or center locating gauge that can be set up quickly with the use of gauge blocks or other measuring apparatus placed directly between freely sliding parts which are clamped after adjustment to the desired coordinates. The invention saves substantial time over the older methods of surface plates, height gauges, buttons, indicators, and other expedients that have been used for laying out jigs, panels, master plates, and other work requiring great accuracy.

In large shops where jig borers are tied up with work, this invention can be used quickly on the drill press, holding to close tolerances, and preventing costly delays waiting for open time on the jig borer. The invention is an inexpensive tool within the reach of small shops, and it makes possible accurate work that formerly could not be done in small shops which can not afford the expenses of a jig borer.

Other objects, features and advantages of the invention will appear or be pointed out as the description proceeds.

In the drawing, forming a part hereof, in which like reference characters indicate corresponding parts in all the views, Fig. 1 is an orthographic view, partly broken away and partly in section, of a gauge embodying this invention, Figs. 2 and 3 are enlarged sectional views taken on the lines 2—2 and 3—3, respectively, of Fig. 1.

The gauge illustrated has a stationary measuring unit including an upper square 10 and a base square 11. The upper square 10 comprises two arms 13 and 14 connected together by a rivet 15 and secured by screws 16 to a vertex block 17 which holds the arms in a definite fixed relation and at right angles to one another. The arms 13 and 14 have their upper and lower faces, respectively, recessed where they contact with one another so that the top faces of both arms are flush with one another. The screws 16 preferably extend through the end portions of the arms 13 and 14, through the block 17; and thread into the corresponding end portions of arms 23 and 24 of the base square 11.

The outer ends of the arms of the upper square 10 and base square 11 are held in spaced relation with one another by spacer blocks 26, and these outer ends of the arms are held firmly against opposite surfaces of the spacer blocks 26 by screws 27. The spacer blocks 26 are of the same height as the vertex block 17 so that the arms of the upper square 10 are parallel to the corresponding arms of the base square 11. As in the case of the screws 16, the screws 27 pass through the arms of the upper square 10, through the spacer blocks, and thread into the arms of the base square 11. The arms of the base square 11 are shown substantially thicker than the arms of the upper square 10 to provide additional strength in the base square 11. It is the base square 11 that is clamped against the work when the gauge of this invention is in use.

The arms of the base square 11 are preferably of the same transverse width as the arms of the upper square 10, and located directly beneath the corresponding arms of the upper square. The spacing between the upper and base squares provides clearance for the heads of clamps used to secure the base square to a workpiece, and also provides clearance for sliding blocks that are used for setting the gauge. If the arms of the base square 11 are made wider than the arms of the upper square 10, the added width is preferably on the outside to provide added clamping surface. At the intersections of the arms of the upper square 10 and base square 11 there are openings 30 to provide clearance for a guide bushing that will be described hereinafter.

There is a movable square 32 with arms 33 and 34 connected to a vertex block 36 in the same way that the arms 13 and 14 of the upper square are connected to the vertex block 17. The vertex block 36, however, is of a different shape from the vertex block 17 and extends into the space between the intersecting arms 33 and 34 to provide increased strength for holding a locater or guide bushing 38. When the invention is used for making holes in a workpiece, the drill is pushed down through the bushing 38 as a guide. This bushing is a press fit in the movable square assembly, and is replaced when it becomes worn. For drilling smaller holes, a reducer bushing is placed in the guide bushing 38. When using the invention for merely locating centers, the bushing 38, or a reducer placed therein, is used as the guide for the center marking tool.

The axis of the guide bushing 38 passes through the vertex of the angle formed by inner edges of the arms 33 and 34. The portion of the vertex block 36 that is within the angle formed by these inner edges of the arms 33 and 34 extends into the space between the upper square 10 of the base square 11 when the bushing 38 is moved into the openings 30 when the gauge is set in its zero position. The vertex block 17 is cut away to provide clearance for the block 36 between the upper square 10 and the base square 11.

There is a guide groove 40 in the bottom face of the arm 14. This groove 40 preferably extends for the full length of the arm 14 and is parallel with the edges of the arm. There is a corresponding groove 40 in the bottom face of the other arm 13 of the upper square 10.

An adjustable stop comprising a clamping block 42 has a channel 43 for receiving the outer edge of the arm 14, and this channel is deep enough to receive the portion of the arm having the guide groove 40. At a region intermediate the ends of the clamping block 42 there is an opening 44 through which a bolt 45 extends. This bolt 45 has a hooked end which engages the channel 40, as shown in Fig. 2. A nut 47 on the outer end of the bolt 42 engages the back of the clamping block 42 and pulls the bolt 45 in a direction to clamp the arm 14 firmly against the bottom of the channel 43 in the block. With this construction, the block 42 is free to slide lengthwise along the arm 14 whenever the clamping nut 47 is released, but the block 42 is held firmly in a fixed position on the arm 14 whenever the clamping nut is screwed up tight against the back of the block 42.

The block 42 has a right angular portion extending normal to the arm 14 and there is a channel 51 in this angular portion of the block corresponding to the channel 43 into which the arm 14 extends. The channel 51, however, is slightly lower than the channel 43 and is in position to receive the edge portion of the arm 34 of the movable square 32. This arm 34 has a guide groove 52 in its bottom face parallel to the edges of the arm. There is a bolt 54 with a hooked end that engages the groove 52. A clamping nut 55 threaded on the end of the bolt 54 is used to hold the arm 34 and the clamping block 42 in any adjusted position.

There is another clamping block 58, similar in construction to the clamping block 42, and having recesses for receiving the edge portions of the arms 13 and 33 of the upper square 10 and movable square 32 respectively. There are clamping nuts 47 and 55 on bolts 45 and 54, respectively, for the clamping block 58.

In order to increase the life of the gauge, the arms 33 and 34 are preferably provided with hard surfacing 60 along the inside edges of these arms 33 and 34. The faces of the vertex block 17 that confront the hard faced surfaces of the arms 33 and 34 are also provided with hard surfacing 60. Various hard facing materials can be used, such as tungsten carbide. The arms of all of the squares 10, 11 and 32 are preferably made of hardened steel so that even though no hard facing material is used, the gauge gives long service as a precision instrument.

In the operation of the invention the base square 11 is first clamped to the work with the movable square 32 in such a position that the guide bushing 38 is within the recess 30 and has its axis located at the vertex of the angle formed by the inner faces of the arms 13 and 14. This locates the inner faces of the arms 33 and 34 in contact with the vertex block 17. The zero or starting point on the work is marked or drilled by a tool inserted through the guide bushing 38.

In order to locate the next center or hole at a definite location with respect to the starting point, the movable square 32 is shifted lengthwise along the arm 13 until the distance between the arm 33 and the vertex block 17 corresponds to one coordinate of the position of the new center to be located. Gauge blocks can be used between the arm 33 and vertex block 17 to measure this distance accurately, and with the gauge blocks still in place, the clamping nut 47 is tightened up to prevent any further movement of the clamping block 58 along the arm 13.

The movable square is then shifted lengthwise along the arm 14 until the distance between the arm 34 and the vertex block 17 is equal to the other coordinate of the new center to be located. When measuring this coordinate, gauge blocks are used between arm 34 and the vertex block 17, and the clamping nut 47 is tightened up to prevent any further displacement of the block 42 along the arm 14. Scales along the arms 13 and 14 are provided for finding the approximate location of the movable square 32 before inserting the gauge blocks, or other measuring device, as for example inside calipers.

The clamping nuts 55 are then tightened to hold the arms 33 and 34 against the bottoms of the channels through which these arms extend in the clamping blocks 58 and 42. In pulling the arms 33 and 34 back against the bottoms of the channels in the clamping blocks 58 and 42, the clamping nuts 55 merely bring the outer faces of these arms 33 and 34 into the relation with the clamping blocks that the arms occupy when the clamping blocks are used to push the arms against the gauge blocks or inside calipers when initially setting the arms to locate a center.

It will be apparent that a similar procedure can be followed for locating other centers at any point on the workpiece surface embraced between the arms of the stationary measuring unit comprising the upper square 10 and base square 11.

The preferred embodiment of the invention has been described, but changes and modifications can be made, and some features can be used in different combinations without departing from the invention as defined in the claims.

I claim as my invention:

1. A hole locating gauge comprising a relatively fixed square having arms with inner edges extending at right angles to one another, a relatively movable square with arms that slide both longitudinally and transversely with respect to the arms of the fixed square, a locater carried by the movable square adjacent its vertex, said fixed square having a recess at the vertex of the angle formed by the inner edges of the fixed square with one another, the recess being large enough to receive the portion of the locater on one side of a center axis of the locater, said movable square being movable along the arms of the fixed square into a position with said axis of the locater at said vertex, blocks on two of said arms for limiting the sliding movement of the movable square with respect to the fixed square, each of said blocks being slidable along its associated arm independently of the movement of the other block, and means for clamping each of the blocks in selected positions lengthwise of the arm on which it slides.

2. A gauge for locating and spacing holes, said gauge comprising a fixed square having arms at right angles to one another, a reference abutment connected to each arm and extending from one side of each arm, a relatively movable square with arms that slide both longitudinally and transversely with respect to the arms of the fixed square, sliding blocks on each of the arms of the fixed square, means that lock the blocks in different adjusted positions lengthwise of the arms of the fixed square and in position to stop movement of the relatively movable square in a direction away from the vertex of the fixed square, a surface on each arm of the movable square confronting one of the reference abutments of the fixed square to provide spaced reference surfaces for receiving one or more gauge blocks or other measuring means, each of said sliding blocks being slidable independently of the other along one of the fixed arms and serving as an adjustable stop for limiting the sliding movement of the movable square with respect to the fixed square, releasable means for clamping each of the blocks in selected positions lengthwise of the arm on which it slides, and a locater carried by the movable square adjacent its vertex.

3. A gauge for locating centers, said gauge comprising a relatively fixed square, a base under the fixed square for clamping the gauge to a workpiece, a relatively movable square facing in the opposite direction from the fixed square so that the arms of the squares overlap, a guide bushing extending through the movable square and having its axis at the vertex of the angle formed by the inner sides of the arms of the movable square, the arms of the fixed square having a recess at the vertex of the angle formed by their inner sides, and said recess being large enough to receive the portion of the bushing that is on one side of the axis of said bushing so that the axis of the bushing is located at said vertex of the fixed square when the gauge is adjusted to zero position, blocks slidable along the arms of one square for limiting the movement of the movable square along the respective arms of the fixed square, and means for recuring the blocks in any set position.

4. A gauge comprising an upper square having arms extending at right angles to one another and with short portions extending beyond the vertex of the square, a base square generally similar to the upper square but of greater vertical thickness, a first spacer block between the upper and base squares at the intersection of the arms and between the short portions of the arms that extend beyond the vertex, other spacer blocks, of equal height with the first spacer block and located between the ends of the arms remote from the vertices of the squares, screws extending through the upper square and the spacer blocks and threaded into the base square for detachably securing the upper and base squares to the spacer blocks, grooves in the under faces of the arms of the upper square and extending parallel with the edges of said arms, a clamp block having a channel for receiving the edge portion of one of the arms of the upper square, the channel being spaced from the bottom of the block by a distance substantially less than the spacing of the upper and base squares from one another, a bolt in the clamp block having a hook that engages in the groove, a clamping nut threaded over the portion of the bolt outside of the clamping block for holding the bottom of the channel in firm contact with the edge of the arm to clamp the block in any selected position lengthwise of the arm, a similar groove and similar clamping block structure on the other arm of the upper square, a movable square having arms with grooves therein extending lengthwise of the arms and parallel to the edges of said arms, and an angularly extending portion of each clamping block with a channel for receiving an edge of one of the arms of the movable square, clamping bolts extending into each of the angularly extending portions of the clamping blocks and having hooks for engaging the grooves in the arms of the movable square, and a guide bushing carried by the movable square and having its axis extending through the vertex of the angle defined by the inner edges of the arms of the movable square, the upper and base squares having recesses at the vertices of the angles defined by their inner edges for receiving one side of the bushing when the gauge is at its zero setting.

5. A gauge for locating and spacing holes, said gauge comprising a fixed square for clamping on a workpiece, said fixed square having arms extending at right angles to one another parallel with the surface of a workpiece to which the square is clamped, a movable structure including two arms at right angles to one another and forming another square that faces in opposite direction to the fixed square and that has its arms extending at right angles to the respective arms of the fixed square, sliding blocks on the arms of the gauge for limiting movement of the movable structure along the arms of the fixed square, a reference abutment extending from each of the arms of the fixed square, a locater carried by the movable structure and having an opening with its axis normal to the surface of the workpiece on which the gauge is clamped, the inside surfaces on the different arms of the movable structure extending in directions that intersect at the axis of the locater and extending in directions for co-operation with a measuring device that is brought in contact with the reference abutment at the end of the same arm, and releasable means for clamping the sliding blocks in selected positions along the length of the arms on which they slide.

JOHN W. HILL.

REFERENCES CITED

The following references are of record in the file of this patent:

UNITED STATES PATENTS

| Number | Name | Date |
| --- | --- | --- |
| 888,377 | Wood | May 19, 1908 |
| 1,183,977 | Hoefle | May 23, 1916 |
| 2,122,875 | Witchger | July 5, 1938 |
| 2,194,085 | Hastings | Mar. 19, 1940 |
| 2,341,107 | MacDonald | Feb. 8, 1944 |
| 2,435,256 | Whitmore | Feb. 3, 1948 |